Sept. 15, 1925.  1,553,688
R. M. HIGHTOWER
EGG TURNING DEVICE FOR INCUBATORS
Filed March 16, 1925
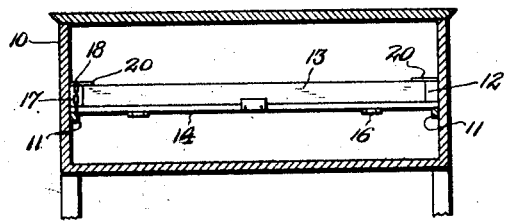
Fig. 1.
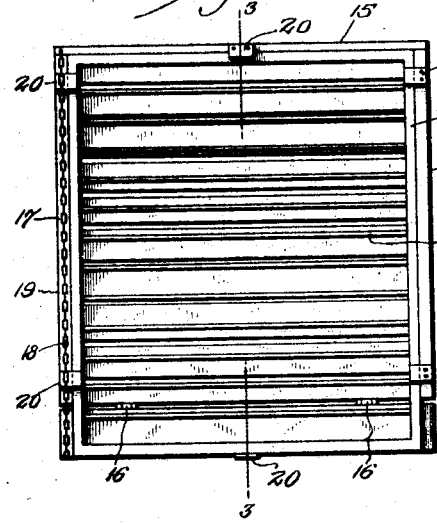
Fig. 2.
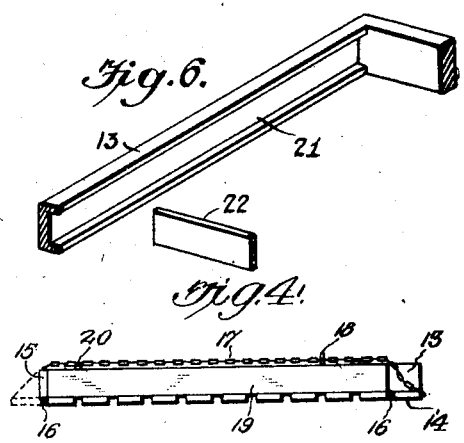
Fig. 6.
Fig. 4.
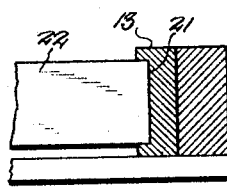
Fig. 5.
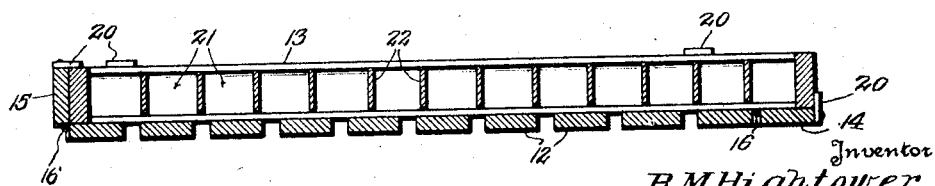
Fig. 3.
Inventor
R. M. Hightower,
By Connell & Connell
Attorneys Patented Sept. 15, 1925.

1,553,688

UNITED STATES PATENT OFFICE.

ROY M. HIGHTOWER, OF SOLDIER SUMMIT, UTAH.

EGG-TURNING DEVICE FOR INCUBATORS.

Application filed March 16, 1925. Serial No. 15,969.

*To all whom it may concern:*

Be it known that I, ROY M. HIGHTOWER, a citizen of the United States, residing at Soldier Summit, in the county of Wasatch and State of Utah, have invented certain new and useful Improvements in Egg-Turning Devices for Incubators, of which the following is a specification.

This invention has reference to an improved egg tray and turner for incubators and has for an object to provide means whereby all eggs in the tray may be turned easily, quickly, evenly and without taking tray out of the incubator, thus reducing the chilling of eggs to a minimum.

It is a further purpose of the invention to provide an egg tray and turner of such novel construction as will allow the maximum size tray to be used in the incubator and which may be so manipulated as to turn all eggs in the tray in one operation.

Briefly described, the invention consists of outside and inside trays working in relatively opposite directions; the outside tray being equipped with movable front and back portions allowing the maximum amount of eggs to be placed in tray and the inside tray or turner being movable forward and backward upon the said movable portions of the outside tray to turn eggs completely over.

Additional features and advantages of the invention may appear from the following detailed description of the device and also from the accompanying drawings, wherein:

Figure 1 is a view depicting a section of an incubator with the invention applied thereto, Figure 2 is a plan view, on an enlarged scale, of the assembled egg tray and turner.

Figure 3 is a section on line 3—3 of Figure 2,

Figure 4 is a side view of the egg tray and the turner, the latter being shifted toward the front of the tray, and Figure 5 is a detailed view illustrating the manner in which the turner is grooved to seat the divider strips.

Figure 6 is a perspective view in broken section of the turner illustrating how the divider strips are movably seated in the turner.

This device may be constructed of any suitable or preferred material and will be of such dimension as required to turn eggs completely over, according to the particular make or size of the incubator to which applied. In the drawings, 10 designates an incubator of conventional type, including the supports 11 for the usual egg tray. In the present invention, the egg tray is in two parts, consisting of an outside tray 12, in which the eggs are supported, and an inside tray or egg turner 13.

The outside tray has front and back portions 14—15 respectively which move on hinges 16. A chain 17 connects the front and back portions on one side of the tray, being fastened to each portion near the ends and being of such length as to allow both movable portions to lie flat at the same time. However, when one of the movable portions lies flat to form part of bottom of outside tray, as in Fig. 4, the other movable portion is held in an upright position, closing the end of the tray, by hooking a link of the chain over a stud or pin 18 projecting above the top of the outside tray on the side 19.

The inside tray or turner is of such dimensions as to fit within the outside tray only when one of the movable parts, either the front 14 or the back 15, is down, as will be clear from Fig. 2; the other part being in upright position, as shown. The outside tray forms the bottom of the inside tray or turner, which is merely a frame held in place by small guides 20 fastened to the top of the outside tray on the front, back and sides thereof, in such numbers as found necessary according to the size of tray. The turner 13 is provided with wide grooves 21 in each of its sides into which fit the ends of the egg-dividers 22, which may consist of small wooden strips extending crosswise of the tray as illustrated so as to divide the eggs into separate rows. The ends of the dividers have a comparative loose fit in the grooves to allow a certain freedom of movement whereby the strips are capable of moving in such a way as to adjust themselves, as eggs are placed in the tray, to any and all size eggs. The space between the strips may be increased, in case it is desired to place large eggs in the tray or turner, by removing some of the strips, this being easily accomplished by simply moving the ends of a strip in opposite directions until disengaged from the grooves.

To operate the device, the chain 17 is disengaged from pin 18, permitting the movable part 15 which is in the upright position to drop back to the position indicated in dotted lines in Fig. 4 so as to form part of the bottom of outside tray 12. The turner 13 is then pushed toward and upon the part 15 as far as it will go, all eggs between the dividers turning over during this movement of the turner. The other movable part 14 may then be placed in an upright position, as in this position it occupies the least space possible in the incubator and it is retained in place by hooking the proper link of the chain over the pin 18.

Since the tray remains within the incubator during the operation of the turner, the possibility of eggs becoming chilled during the turning over process is reduced to a minimum, particularly since all the eggs are quickly turned over in one operation.

What is claimed is:

1. An egg tray and turner for incubators comprising outside and inside trays relatively movable in opposite directions for turning all eggs in the tray in one operation, the said outside tray having front and back upright portions pivotally movable to form part of the bottom of the outside tray.

2. An egg tray and turner for incubators comprising an outside tray having front and back portions changeable from an upright to a horizontal position to form part of the bottom of the outside tray, means for holding one of the portions in upright position while the other portion forms part of the said bottom, and an inside tray of such dimensions as to fit into said outside tray only when one of said movable parts is in bottom-forming position, said inside tray being slidable within the outside tray as the position of said movable portions are alternately changed from the vertical to the horizontal.

In testimony whereof I affix my signature.

ROY M. HIGHTOWER.